(12) United States Patent
Fuller et al.

(10) Patent No.: US 7,156,365 B2
(45) Date of Patent: Jan. 2, 2007

(54) METHOD OF CONTROLLING MICROVALVE ACTUATOR

(75) Inventors: Edward Nelson Fuller, Manchester, MI (US); Clark Lowman, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 149 days.

(21) Appl. No.: 10/899,895

(22) Filed: Jul. 27, 2004

(65) Prior Publication Data

US 2006/0022160 A1   Feb. 2, 2006

(51) Int. Cl.
*F16K 31/02* (2006.01)

(52) U.S. Cl. ............... 251/129.04; 251/129.05

(58) Field of Classification Search ........... 251/129.05, 251/129.04
See application file for complete search history.

(56) References Cited

U.S. PATENT DOCUMENTS

| | | | |
|---|---|---|---|
| 886,045 A | 4/1908 | Ehrlich et al. |
| 1,886,205 A | 11/1932 | Lyford |
| 1,926,031 A | 9/1933 | Boynton |
| 2,412,205 A | 12/1946 | Cook |
| 2,504,055 A | 4/1950 | Thomas |
| 2,840,107 A | 6/1958 | Campbell |
| 2,875,779 A | 3/1959 | Campbell |
| 3,031,747 A | 5/1962 | Green |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,398,252 A | 8/1983 | Frait |
| 4,434,813 A | 3/1984 | Mon |
| 4,581,624 A | 4/1986 | O'Connor |
| 4,628,576 A | 12/1986 | Giachino et al. |
| 4,647,013 A | 3/1987 | Giachino et al. |
| 4,661,835 A | 4/1987 | Gademann et al. |
| 4,721,344 A | 1/1988 | Frait et al. |
| 4,772,935 A | 9/1988 | Lawler et al. |

(Continued)

FOREIGN PATENT DOCUMENTS

DE     2215526     10/1973

(Continued)

OTHER PUBLICATIONS

K.R. Williams, N.I. Maluf, E.N. Fuller, R.J. Barron, D.P. Jaeggi, and B.P. van Drieenhuizen, "A Silicon Microvalve For The Proportional Control of Fluids" Transducers '99, Proc. 10th International Conference on Solid State Sensors and Actuators, held Jun. 7-10, 1999, Sendai, Japan, pp. 18-21.

(Continued)

*Primary Examiner*—Justine R. Yu
*Assistant Examiner*—Andrew J. Rost
(74) *Attorney, Agent, or Firm*—MacMillan, Sobanski & Todd, LLC

(57) ABSTRACT

In a method of controlling an actuator of a microvalve, a controller is provided for supplying a voltage to the actuator. The controller provides an initial voltage to the actuator which is effective to actuate the microvalve. Then, the controller provides a pulsed voltage to the actuator which is effective to continue the actuation of the microvalve.

27 Claims, 11 Drawing Sheets

U.S. PATENT DOCUMENTS

| | | | |
|---|---|---|---|
| 4,821,997 A | 4/1989 | Zdeblick | |
| 4,824,073 A | 4/1989 | Zdeblick | |
| 4,826,131 A | 5/1989 | Mikkor | |
| 4,828,184 A | 5/1989 | Gardner et al. | |
| 4,869,282 A | 9/1989 | Sittler et al. | |
| 4,891,120 A | 1/1990 | Sethi et al. | |
| 4,938,742 A | 7/1990 | Smits | |
| 4,943,032 A | 7/1990 | Zdeblick | |
| 4,959,581 A | 9/1990 | Dantlgraber | |
| 4,966,646 A | 10/1990 | Zdeblick | |
| 5,029,805 A | 7/1991 | Albarda et al. | |
| 5,037,778 A | 8/1991 | Stark et al. | |
| 5,050,838 A | 9/1991 | Beatty et al. | |
| 5,054,522 A | 10/1991 | Kowanz et al. | |
| 5,058,856 A | 10/1991 | Gordon et al. | |
| 5,061,914 A | 10/1991 | Busch et al. | |
| 5,064,165 A | 11/1991 | Jerman | |
| 5,065,978 A | 11/1991 | Albarda et al. | |
| 5,066,533 A | 11/1991 | America et al. | |
| 5,069,419 A | 12/1991 | Jerman | |
| 5,074,629 A | 12/1991 | Zdeblick | |
| 5,082,242 A | 1/1992 | Bonne et al. | |
| 5,096,643 A | 3/1992 | Kowanz et al. | |
| 5,116,457 A | 5/1992 | Jerman | |
| 5,131,729 A | 7/1992 | Wetzel | |
| 5,133,379 A | 7/1992 | Jacobsen et al. | |
| 5,142,781 A | 9/1992 | Mettner et al. | |
| 5,161,774 A | 11/1992 | Engelsdorf et al. | |
| 5,169,472 A | 12/1992 | Goebel | |
| 5,176,358 A | 1/1993 | Bonne et al. | |
| 5,177,579 A | 1/1993 | Jerman | |
| 5,178,190 A | 1/1993 | Mettner | |
| 5,179,499 A | 1/1993 | MacDonald et al. | |
| 5,180,623 A | 1/1993 | Ohnstein | |
| 5,197,517 A | 3/1993 | Perera | |
| 5,209,118 A | 5/1993 | Jerman | |
| 5,215,244 A | 6/1993 | Buchholz et al. | |
| 5,216,273 A | 6/1993 | Doering et al. | |
| 5,217,283 A | 6/1993 | Watanabe | |
| 5,238,223 A | 8/1993 | Mettner et al. | |
| 5,244,537 A | 9/1993 | Ohnstein | |
| 5,267,589 A | 12/1993 | Watanabe | |
| 5,271,431 A | 12/1993 | Mettner et al. | |
| 5,271,597 A | 12/1993 | Jerman | |
| 5,309,943 A | 5/1994 | Stevenson et al. | |
| 5,325,880 A | 7/1994 | Johnson et al. | |
| 5,333,831 A | 8/1994 | Barth et al. | |
| 5,336,062 A | 8/1994 | Richter | |
| 5,355,712 A | 10/1994 | Petersen et al. | |
| 5,368,704 A | 11/1994 | Madou et al. | |
| 5,375,919 A | 12/1994 | Furuhashi | |
| 5,400,824 A | 3/1995 | Gschwendtner et al. | |
| 5,417,235 A | 5/1995 | Wise et al. | |
| 5,445,185 A | 8/1995 | Watanabe et al. | |
| 5,454,906 A | 10/1995 | Baker et al. | |
| 5,458,405 A | 10/1995 | Watanabe | |
| 5,460,908 A | 10/1995 | Reinberg | |
| 5,553,790 A | 9/1996 | Findler et al. | |
| 5,566,703 A | 10/1996 | Watanabe et al. | |
| 5,577,533 A | 11/1996 | Cook, Jr. | |
| 5,785,295 A | 7/1998 | Tsai | |
| 5,810,325 A | 9/1998 | Carr | |
| 5,818,678 A | 10/1998 | Berg et al. | |
| 5,838,351 A | 11/1998 | Weber | |
| 5,848,605 A | 12/1998 | Bailey et al. | |
| 5,873,385 A | 2/1999 | Bloom et al. | |
| 5,909,078 A | 6/1999 | Wood et al. | |
| 5,926,955 A | 7/1999 | Kober | |
| 5,941,608 A | 8/1999 | Campau et al. | |
| 5,954,079 A | 9/1999 | Barth et al. | |
| 5,955,817 A | 9/1999 | Dhuler et al. | |
| 5,970,998 A | 10/1999 | Talbot et al. | |
| 5,994,816 A | 11/1999 | Dhuler et al. | |
| 6,019,437 A | 2/2000 | Barron et al. | |
| 6,023,121 A | 2/2000 | Dhuler et al. | |
| 6,038,928 A | 3/2000 | Maluf et al. | |
| 6,105,737 A | 8/2000 | Weigert et al. | |
| 6,114,794 A | 9/2000 | Dhuler et al. | |
| 6,163,131 A * | 12/2000 | Gartstein et al. | 320/118 |
| 6,168,395 B1 | 1/2001 | Quenzer et al. | |
| 6,171,972 B1 | 1/2001 | Mehregany et al. | |
| 6,184,065 B1 | 2/2001 | Smith et al. | |
| 6,279,606 B1 | 8/2001 | Hunnicutt et al. | |
| 6,386,507 B1 | 5/2002 | Dhuler et al. | |
| 6,432,630 B1 * | 8/2002 | Blankenstein | 435/4 |
| 6,494,804 B1 | 12/2002 | Hunnicutt et al. | |
| 6,505,811 B1 | 1/2003 | Barron et al. | |
| 6,523,560 B1 | 2/2003 | Williams et al. | |
| 6,533,366 B1 * | 3/2003 | Barron et al. | 303/113.1 |
| 6,540,203 B1 | 4/2003 | Hunnicutt | |
| 6,581,640 B1 | 6/2003 | Barron | |
| 6,761,420 B1 | 7/2004 | Maluf et al. | |
| 6,773,429 B1 * | 8/2004 | Sheppard et al. | 604/891.1 |
| 6,845,962 B1 | 1/2005 | Barron et al. | |
| 2002/0143437 A1 * | 10/2002 | Handique et al. | 700/266 |
| 2003/0092526 A1 | 5/2003 | Hunnicutt et al. | |
| 2003/0098612 A1 | 5/2003 | Maluf et al. | |

FOREIGN PATENT DOCUMENTS

| | | |
|---|---|---|
| DE | 2930779 | 2/1980 |
| DE | 340104 | 7/1985 |
| DE | 4101575 | 7/1992 |
| DE | 4417251 | 11/1995 |
| DE | 4422942 | 1/1996 |
| EP | 0250948 | 1/1988 |
| EP | 0261972 | 3/1988 |
| EP | 0628742 | 12/1994 |
| EP | 0899860 | 3/1999 |
| GB | 2238267 | 5/1991 |
| WO | WO 99/16096 | 4/1999 |
| WO | WO 0014415 | 3/2000 |
| WO | WO 01/71226 | 9/2001 |

OTHER PUBLICATIONS

Delphi Automotive Systems product brochure (1997). Variable Bleed Solenoid (VBS) for Transmission, copyright 1997. (2 pages total).

Delphi Automotive Systems product brochure (1998). On/Off Transmission Solenoids, copyright 1998. (2 pages total).

Duffy, James E. (1994). "Automatic Transmission Fundamentals," Modern Automotive Technology, copyright 1994, p. 707.

Klaasen et al. "Silicon Fusion Bonding and Deep Reactive Ion Etching; A New Technology for Microstructures" Proc., Transducers 95 Stockholm Sweden (1995) 556-559.

Konarski, Mark M. (May 31 to Jun. 4, 1998). "Cure Parameter Effects on the Tg and CTE of Flip Encapsulants," 43rd International SAMPE Symposiom and Exhibition. Materials and Process Affordability. Keys to the Future. Anaheim, CA, vol. 1 pp. 823-832.

Linder et al., "Deep Dry Etching Techniques as a New IC Compatible Tool for Silicon Micromachining", Proc. Transducers, vol. 91, pp. 524-527 (1991).

Yunkin et al., "Highly Anisotropic Selective Reactive Ion Etching of Deep Trenches in Silicon", Microelectronic Engineering, vol. 23, pp. 373-376 (1994).

Noworolski et al., "Process for in-plane and out-of-plane single-crystal-silicon thermal microactuators", Sensors and Actuators A. vol. 55, No. 1, 1996, pp. 65-69.

Petersen et al. "Surfaced Micromachined Structures Fabricated with Silicon Fusion Bonding" Proc., Transducers 91, (Jun. 1992) pp. 397-399.

Shinozawa et al., "A Proportional Microvalve Using a Bi-Stable Magnetic Actuator", Micro Electro Mechanical Systems, pp. 233-237, 1997.

Bosch et al., "A Silicon Microvalve with Combined Electromagnetic/Electrostatic Actuation", Sensors and Actuators, vol. A37/A38, pp. 684-692, 1993.

Bartha et al., "Low Temperature Etching of Si in High Density Plasma Using SF6/O2", Microelectronic Engineering 27, pp. 453-456 (1995).

Fung et al., "Deep Etching of Silicon Using Plasma", Micromachining and Micropackaging of Transducers, pp. 159-164 (1985).

Ayon et al., "Etching Characterisitics and Profile Control in a Time Multiplexed Inductively Coupled Plasma Etcher", Solid-State Sensor and Actuator Workshop, pp. 41-44 (1998).

* cited by examiner

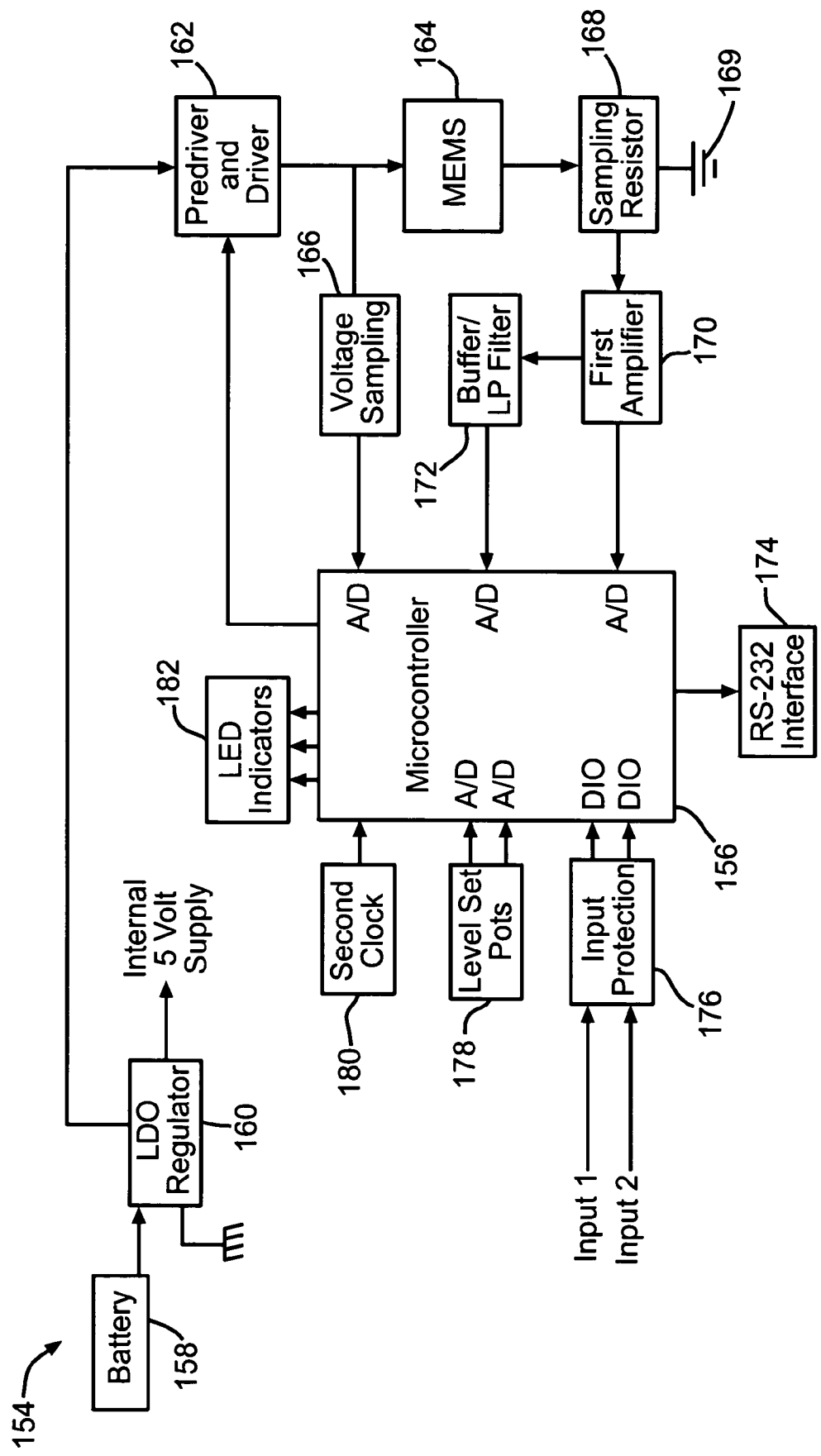

METHOD OF CONTROLLING MICROVALVE ACTUATOR

BACKGROUND OF THE INVENTION

This invention relates in general to MEMS (MicroElectroMechanical Systems), and in particular to a method of controlling an actuator of a microvalve.

MEMS is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. For example, various microvalve devices are disclosed in U.S. Pat. Nos. 6,019,437; 6,279,606 B1; 6,494,804 B1; 6,505,811 B1; 6,533,366 B1; 6,540,203 B1; and 6,637,722 B2. A typical microvalve device includes a displaceable member or valve movably supported by a body and operatively coupled to an actuator for movement between a closed position and a fully open position. When placed in the closed position, the microvalve blocks or closes a first fluid port that is normally in fluid communication with a second fluid port, thereby preventing fluid from flowing between the fluid ports. When the microvalve moves from the closed position to the fully open position, fluid is increasingly allowed to flow between the fluid ports. A normally closed microvalve is one that will go closed in the absence of an external energizing signal, such as the application of an electrical current from an electrical actuator. A normally open microvalve is open in the absence of the application of an external energizing signal.

The actuator is usually driven by voltage supplied from a power source. It would be advantageous to be able to reduce the total amount of power required to actuate the microvalve.

SUMMARY OF THE INVENTION

This invention relates to a method of controlling an actuator of a microvalve. A controller is provided for supplying a voltage to the actuator. The controller provides an initial voltage to the actuator which is effective to actuate the microvalve. Then, the controller provides a pulsed voltage to the actuator which is effective to continue the actuation of the microvalve. Preferably, the pulsed voltage is a pulse width modulated voltage.

The invention also relates to a controller for controlling an actuator of a microvalve. The controller includes a logic circuit having an input port and an output port. The logic circuit is responsive to a trigger signal at the input port to generate a constant output signal at the output port for a predetermined amount of time, after which the logic circuit generates a pulsed output signal at the output port. The controller also includes a normally open switch adapted to be connected between a power source and a microvalve actuator. The switch is connected to the logic circuit output port and is responsive to the output signal to close for the predetermined amount of time in order to provide an initial constant voltage to the microvalve actuator, and then to alternatingly open and close in response to the pulsed output signal in order to provide a pulsed voltage to the microvalve actuator.

The invention further relates to a method of operating a microvalve in a vehicle control system. The method includes the steps of: (a) providing a controller connected between a power source and a microvalve actuator; (b) providing a constant voltage to the microvalve actuator upon the controller receiving a trigger; and (c) providing a pulsed voltage to the microvalve actuator upon elapse of a predetermined time period.

Various advantages of this invention will become apparent to those skilled in the art from the following detailed description of the preferred embodiments, when read in light of the accompanying drawings.

BRIEF DESCRIPTION OF THE DRAWINGS

FIG. 6 is a block diagram of a microcontroller based MEMS controller that can be used according to the invention to control the microvalve actuator.

DETAILED DESCRIPTION OF THE PREFERRED EMBODIMENTS

The present invention relates to a method of controlling an actuator of a microvalve, to a controller suitable for use in the method, and to a method of operating a microvalve in a vehicle control system. The microvalve can be a part of any type of microvalve device. In some embodiments, the microvalve device is a component of a vehicle anti-lock brake system or other automotive system. For example, the invention can be used with an anti-lock brake system microvalve that needs to be held on during the duration of a stop and pulsed off for short duration pressure reapplies. Also, the invention can be used to control any type of actuator of a microvalve. In some embodiments, the actuator is a thermal actuator in which heating of the actuator causes it to move in order to open or close the microvalve.

Example of Microvalve Device

Figure 1A:
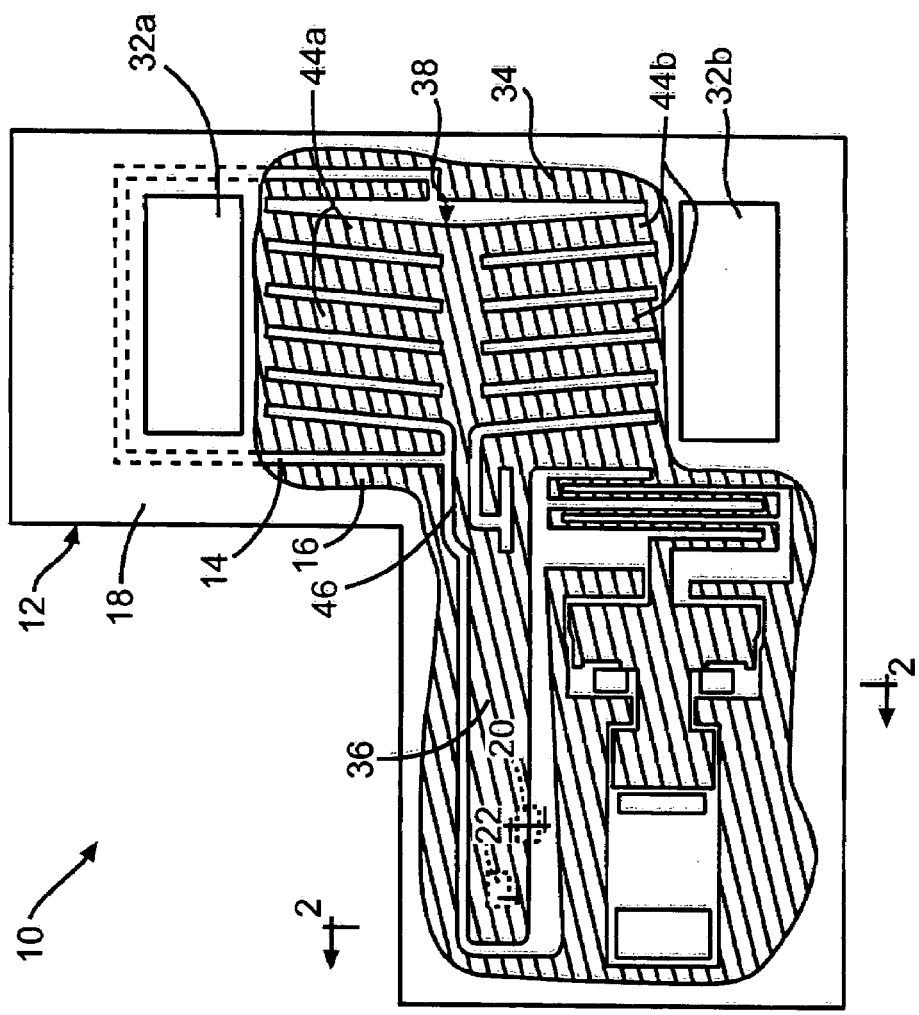
FIG. 1A is a top plan view of a microvalve device having an actuator that can be controlled according to the invention. The drawing is partially broken away to show the microvalve device in a first position.
Figure 1B:
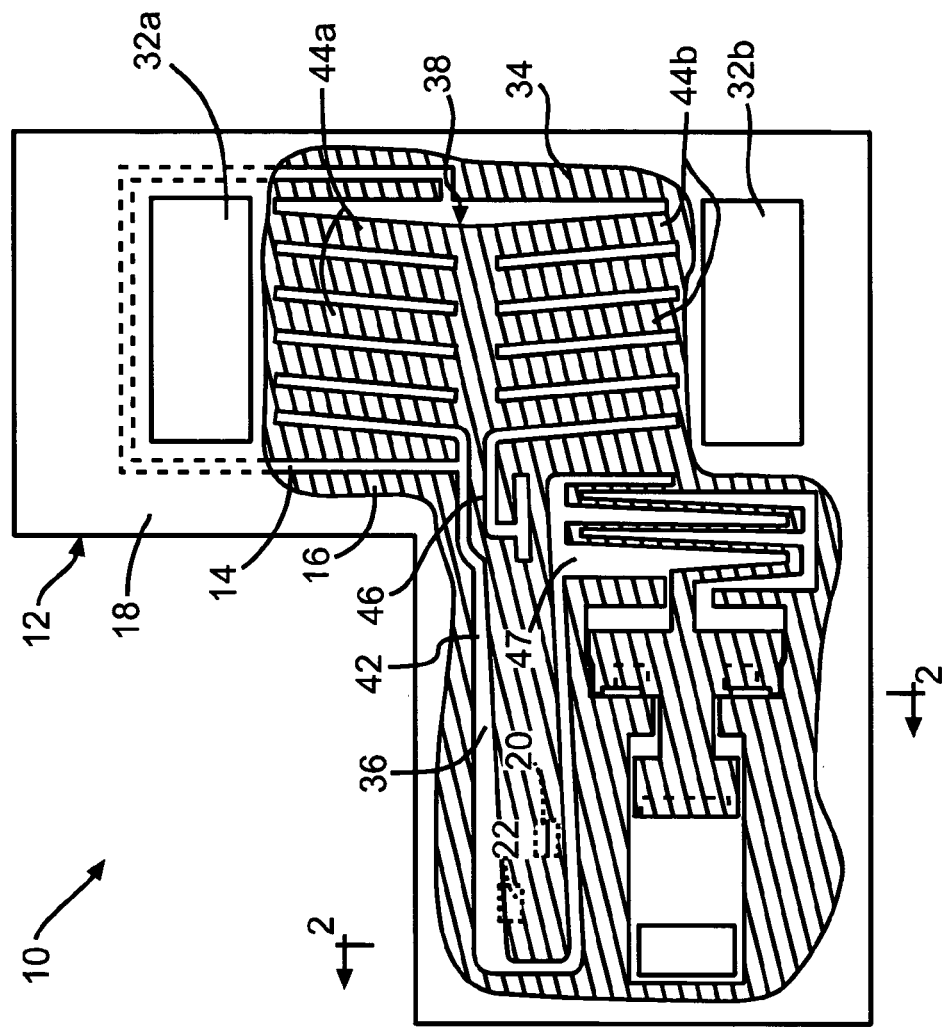
FIG. 1B is a view similar to FIG. 1A, except with the microvalve device shown in a second position.
Figure 2:
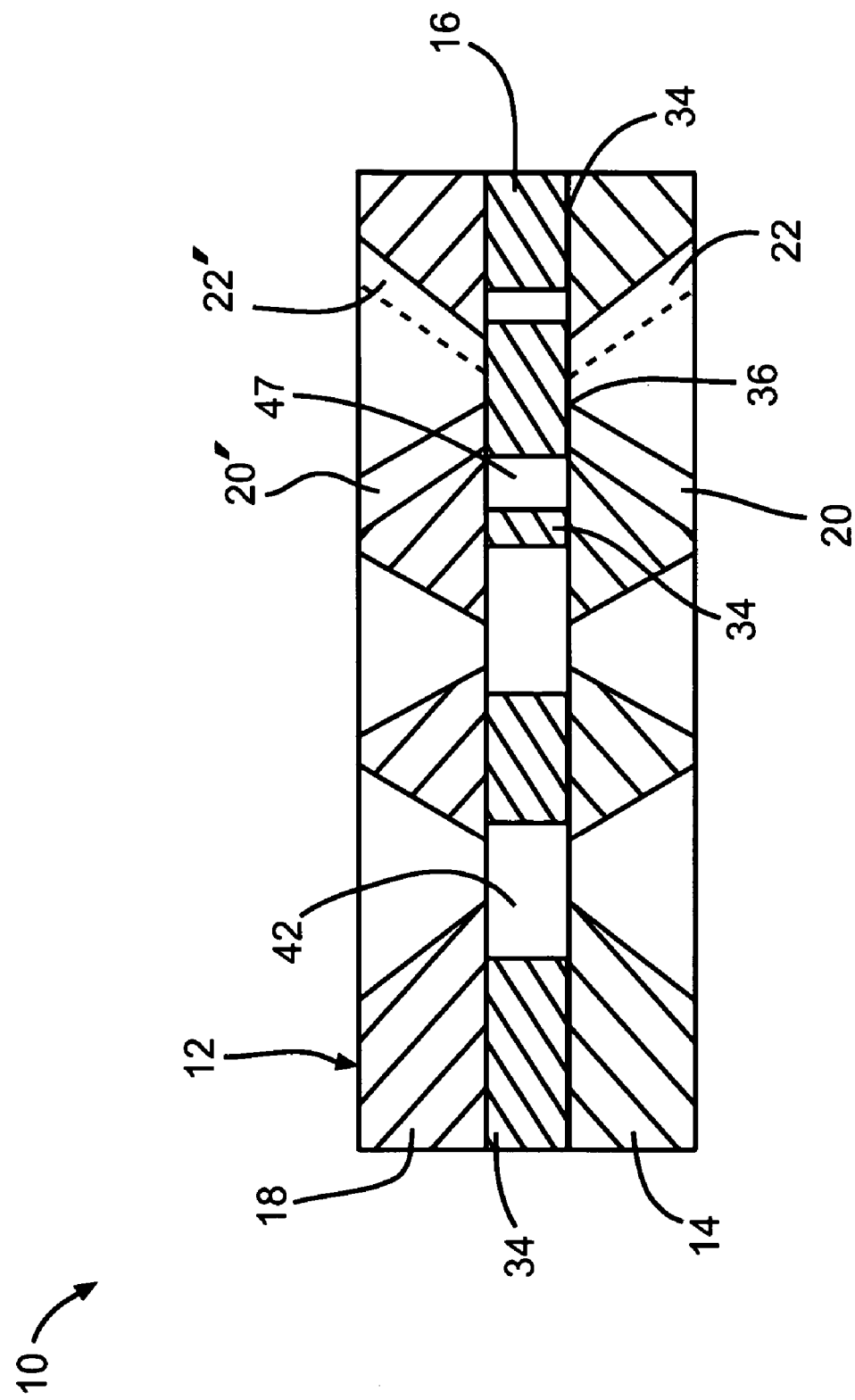
FIG. 2 is a sectional view of the microvalve device taken along line 2—2 of FIG. 1A.

One example of a microvalve device suitable for use with the invention is described in U.S. Pat. No. 6,540,203 B1 to Hunnicutt, issued Apr. 1, 2003 (incorporated by reference herein). FIGS. 1A, 1B and 2 of the '203 patent are attached. For the sake of brevity, only those portions of the '203 patent that are particularly relevant to the present invention will be discussed here. In FIG. 1A, a microvalve device for controlling fluid flow in a fluid circuit is shown generally at 10. The microvalve device 10 includes a body indicated generally at 12. The body 12 includes first, second and third plates 14, 16 and 18, respectively. Preferably, each plate 14, 16, 18 is made of semiconductor material, such as silicon.

The first plate 14 defines a first pilot port 20 and a second pilot port 22. The first pilot port 20 is adapted for connection with one of a "low pressure" fluid medium or source (not shown) and a "high pressure" fluid medium or source (not shown). The second pilot port 22 is adapted for connection with the other of the "low pressure" fluid source and the "high pressure" fluid source.

Referring to FIG. 2, the third plate 18 defines a first pilot port 20' opposing the first pilot port 20 and a second pilot port 22' opposing the second pilot port 22. The pilot ports 20' and 22' are adapted for connection with the fluid sources associated with the first and second pilot ports 20 and 22, respectively.

As shown in FIG. 1A, the third plate 18 includes a pair of electrical contacts 32a and 32b disposed in corresponding openings formed in the third plate 18. The electrical contacts 32a, 32b contact the second plate 16 and are adapted for connection to a suitable power source (not shown) for providing a voltage between the contacts 32a and 32b.

The second plate 16 includes the following main components: a fixed portion 34; a first microvalve embodied as a pilot valve 36 supported by the fixed portion 34 for fully opening and closing the pilot ports 20, 20', 22, 22'; and an actuator 38 for moving the pilot valve 36. The fixed portion 34 defines a cavity 42 and is fixedly attached to the first and third plates 14, 16.

The pilot valve 36 is a microvalve formed as an elongated beam having an end attached to the fixed portion 34. The pilot valve 36 is movably disposed in the cavity 42 for movement between a first position and a second position. FIGS. 1A and 1B show the pilot valve 36 in the first and second positions, respectively. In the first position, the pilot valve 36 blocks or substantially closes the second pilot ports 22, 22' and unblocks or fully opens the first pilot ports 20, 20'. In the second position, the pilot valve 36 unblocks or fully opens the second pilot ports 22, 22' and blocks or substantially closes the first pilot ports 20, 20'.

The actuator 38 is operably coupled to the pilot valve 36 for moving the pilot valve 36 between the first and second positions. The actuator 38 includes multiple pairs of opposing ribs 44a and 44b. Each rib 44a, 44b has a first end and a second end. While the ribs 44a and 44b are shown as being linear and of uniform cross-section along the length thereof, it should be understood that the ribs 44a and 44b may be curved, angled, or of non-uniform cross-section if suitable for a particular application. The first ends of the ribs 44a and 44b are attached to the fixed portion 34 adjacent the electrical contacts 32a and 32b, respectively. The second ends of the ribs 44a, 44b are attached to a spine 46 at respective angles thereto. Each pair of ribs 44a and 44b are generally at an angle to one another to form a chevron having an apex at the spine 46. When the electrical contacts 32a, 32b are supplied with voltage, the voltage passes between the electrical contacts 32a, 32b through the ribs 44a, 44b. In turn, the ribs 44a, 44b thermally expand. As the ribs 44a, 44b expand, the ribs 44a, 44b elongate, which in turn causes the spine 46 to be displaced. By regulating the amount of voltage supplied through the ribs 44a, 44b, the amount of expansion of the ribs 44a, 44b can be controlled, thereby controlling the amount of displacement of the spine 46.

The spine 46 is attached to the pilot valve 36 at a point spaced apart from the supported end of the pilot valve 36. When displaced, the spine 46 imparts a force on the pilot valve 36 that produces a moment about the supported end of the pilot valve 36. The moment causes the pilot valve 36 to resiliently bend a first direction about the supported end of the pilot valve 36, which causes the pilot valve 36 to move from the first position to the second position. When the electrical contacts 32a, 32b are de-energized, the ribs 44a, 44b cool and in turn contract. The contraction of the ribs 44a, 44b causes the spine 46 to be displaced in a direction opposite the direction of the displacement of the spine 46 due to the expansion of the ribs 44a, 44b. The displacement of spine 46 due to the contraction of the ribs 44a, 44b bends the pilot valve 36 in a second direction about the supported end of the pilot valve 36, which causes the pilot valve 36 to move from the second position to the first position.

It should be appreciated that the pilot valve 36 may be replaced by any suitable microvalve capable of opening and closing fluid ports. Additionally, the actuator 38 may be replaced by any actuation means suitable for actuating the pilot valve 36 or an appropriate alternative microvalve.

Initial Voltage and Pulsed Voltage According to the Invention

The present invention controls a microvalve actuator by providing an initial voltage from a controller to the actuator which is effective to actuate the microvalve, and then providing a pulsed voltage from the controller to the actuator which is effective to continue the actuation of the microvalve. The pulsed voltage results in the use of less power than the initial voltage, thereby reducing the total amount of power required to actuate the microvalve.

The initial voltage provided from the controller to the actuator can be any type of voltage that is effective to actuate the microvalve. For example, the initial voltage can be effective to move the microvalve from a fully closed position to a fully open position, or from a fully open position to a fully closed position, depending on the particular system in which the microvalve is employed. The initial voltage can accomplish this in any suitable manner. Typically, the initial voltage is a fully-on voltage provided in response to a fully-on digital electric signal, although less than a fully-on voltage can be used if it is effective to actuate the microvalve. The initial voltage is usually a relatively short duration voltage, and typically a short initial pulse. For example, the initial voltage may have a duration within a range of from about 1 msec to about 1000 msec.

Figure 3A:
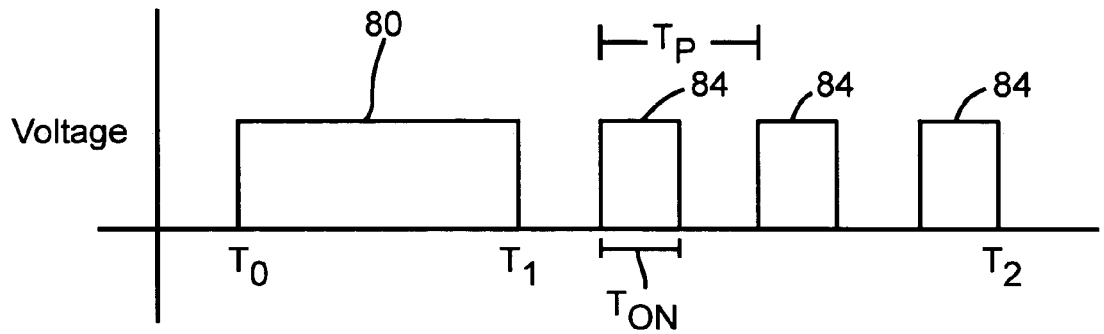
FIGS. 3A, 3B and 3C are plots of voltage supplied to an actuator of a microvalve device over time by a MEMS controller according to the invention.
Figure 3B:
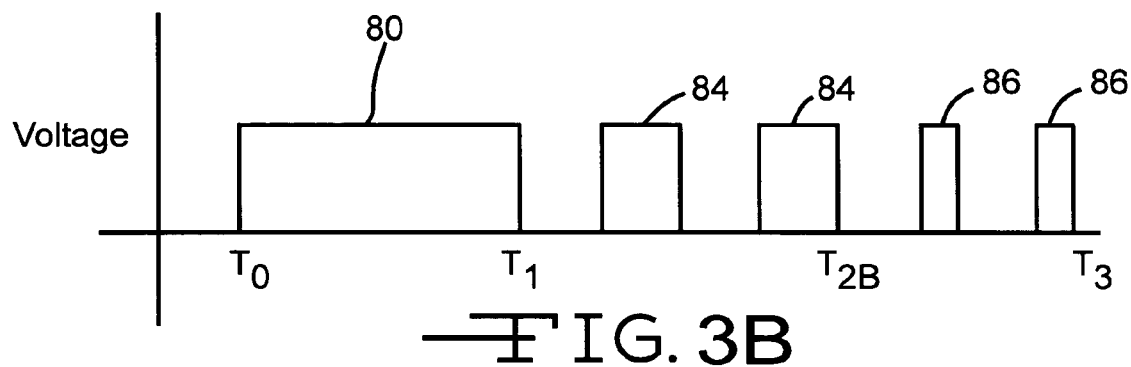
Figure 3C:
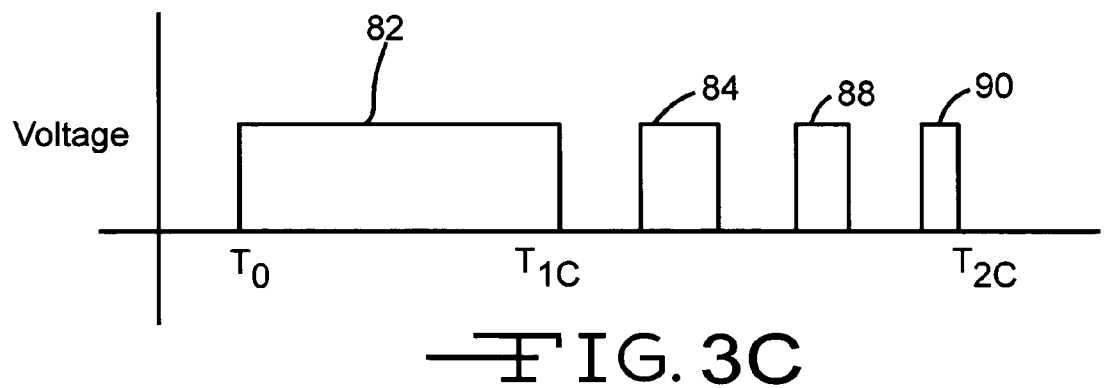

FIGS. 3A, 3B and 3C are plots of voltage supplied from a controller to a microvalve actuator over time, in response to a trigger signal. The voltage includes an initial voltage followed by a pulsed voltage according to the invention. As shown in FIG. 3A, a constant initial voltage 80 is supplied to the microvalve actuator in response to the trigger signal between time $T_0$, the start of the initial voltage, and time $T_1$, the end of the initial voltage. FIG. 3B also shows a constant initial voltage 80 supplied to the microvalve actuator. In FIG. 3C, the constant initial voltage 82 caused by the trigger signal has a slightly longer duration (between time $T_0$ and time $T_{1C}$) than the voltage 80 shown in FIGS. 3A and 3B. Although FIGS. 3A–3C illustrate a constant initial voltage caused by a trigger signal which is fully on for a predetermined time, the initial voltage can also be a pulsed voltage, such as a pulse width modulated voltage, provided it is effective to actuate the microvalve.

The controller can include any suitable components, and it can work in cooperation with any suitable related equipment, to provide the initial voltage. In some embodiments, the controller sends an initial electric signal to an electronic switch of the controller (e.g., an FET switch), and the electronic switch regulates voltage supplied from a power source (e.g., a battery) to provide the initial voltage to the actuator. The power source can be a component of the controller or it can be separate from the controller. In the microvalve device shown in FIGS. 1A and 1B, the initial voltage is provided to the electrical contacts 32a and 32b, which causes the actuator 38 to move the microvalve 36.

After the initial voltage has caused the actuation of the microvalve, a pulsed voltage is provided from the controller to the actuator which is effective to continue the actuation of the microvalve. For example, if the initial voltage causes the actuator to move the microvalve to the fully open position, the pulsed voltage is effective to cause the actuator to keep the microvalve fully open. The pulsed voltage is usually provided immediately following the end of the initial voltage.

The pulsed voltage results in the use of less power than the initial voltage. As a result, the total amount of power required to open the microvalve and then keep it open is reduced compared to the use of a constant fully on voltage. Additionally, the reduced power use reduces heating of the components. For example, if the actuator is a thermal actuator such as the actuator 38 shown in FIGS. 1A and 1B, the present invention allows the actuator to heat quickly under the full power of the initial voltage, and to then be held in position at a reduced power provided by the pulsed voltage.

The pulsed voltage provided by the controller can be any type of pulsed voltage that is effective to continue the actuation of the microvalve. By "pulsed voltage" is meant a voltage that is periodically switched between zero volts and a predetermined voltage. The individual on pulses and off pulses can have either the same or different durations during any cycle.

The "duty cycle" of the pulsed voltage refers to the percentage of time that the voltage is on compared to the total cycle time. For example, a 50% duty cycle is one that is "on" for one-half of each cycle and "off" for one-half of each cycle. The invention contemplates a pulsed voltage having any suitable duty cycle within a range from 0% to 100%, preferably within a range of from about 5% to about 50%. In a preferred embodiment, the pulsed voltage has a frequency within a range from about 200 Hz to about 100,000 Hz, and preferably within a range from about 200 Hz to about 4000 Hz.

In a preferred embodiment, the pulsed voltage is a pulse width modulated (PWM) voltage; however, the invention also could be practiced with a constant on-time, variable frequency voltage (PFM) A "pulse width modulated" voltage is a voltage in which the "on" part of the duty cycle is varied during the total cycle time. For example, the duty cycle can be a relatively low percentage for one cycle and then change to a relatively high percentage for a later cycle. The duty cycle of the PWM voltage can vary within the range discussed above.

As shown in FIG. 3A, the controller provides to the microvalve actuator a plurality of voltage pulses 84 having a constant duty cycle between time $T_1$, the end of the initial voltage and the start of the pulsed voltage, and time $T_2$, the end of the pulsed voltage. The actual duration of the pulsed voltage would usually be longer than the time shown in the plot. In the example shown, the voltage pulses 84 all have the same period, $T_P$. The duty cycle (in %) is calculated as the time that the signal 84 is on, $T_{ON}$, divided by the period, $T_P$, times 100. In FIG. 3A, the duty cycle is approximately 50%; however, the invention also may be practiced with other constant duty cycles.

In the example shown in FIG. 3B, the pulsed voltage is changed such that first voltage pulses 84 having a constant first duty cycle are provided to the microvalve actuator between time $T_1$ and time $T_{2B}$, and second voltage pulses 86 having a constant second duty cycle are provided between time $T_{2B}$ and time $T_3$. The second duty cycle is less than the first duty cycle, so that the second voltage pulses 86 have shorter on-times than the first voltage pulses 84. In the illustrated embodiment, the duty cycle between time $T_1$ and time $T_{2B}$ is approximately 50% while the duty cycle between time $T_{2B}$ and time $T_3$ is approximately 33%; however, the invention may also be practiced with other changing duty cycles. Thus, the pulsed voltage can have multiple different duty cycles during the total cycle time. Additionally, the invention also may be practiced with the second duty cycle being greater than the first duty cycle.

FIG. 3C illustrates a pulse width modulated voltage in which the duty cycle is reduced during the total cycle time (between time $T_{1C}$ and $T_{2C}$), causing a first voltage pulse 84 which is longer than a second voltage pulse 88, which in turn is longer than a third voltage pulse 90. Thus, the duty cycle of the pulsed signal can be varied during the total cycle time. Similarly, the duty cycle may be increased during the total cycle time. Finally, the duty cycle may vary with both increases and decreases during the total cycle time. Also, as indicated above, the frequency can be varied (not shown).

The controller can include any suitable components, and it can work in cooperation with any suitable related equipment, to provide the pulsed voltage. In some embodiments, the controller sends a pulsed electric signal to an electronic switch of the controller (e.g., an FET switch), and the switch regulates voltage from a power source (e.g., a battery) to provide the pulsed voltage to the actuator. The controller can include an oscillator to provide the pulsed electric signal frequency.

The pulsed voltage is continued for as long as necessary to continue the actuation of the microvalve, depending on the particular system in which the microvalve is employed. In some embodiments of the invention, the pulsed voltage is ended at a predetermined time. For example, when a normally closed microvalve no longer needs to be held in the open position, the pulsed voltage is ended. In other embodiments, the pulsed voltage does not have an end but rather it continues until the controller receives a stop signal. In the latter embodiments, the invention can maintain a minimum duty cycle.

Described below are several examples of control algorithms and electronic controllers that can be used in the invention. It will be recognized that the invention can be practiced using many different types of control algorithms and controllers, and it is not limited to those illustrated.

Control Algorithms

Figure 4A:
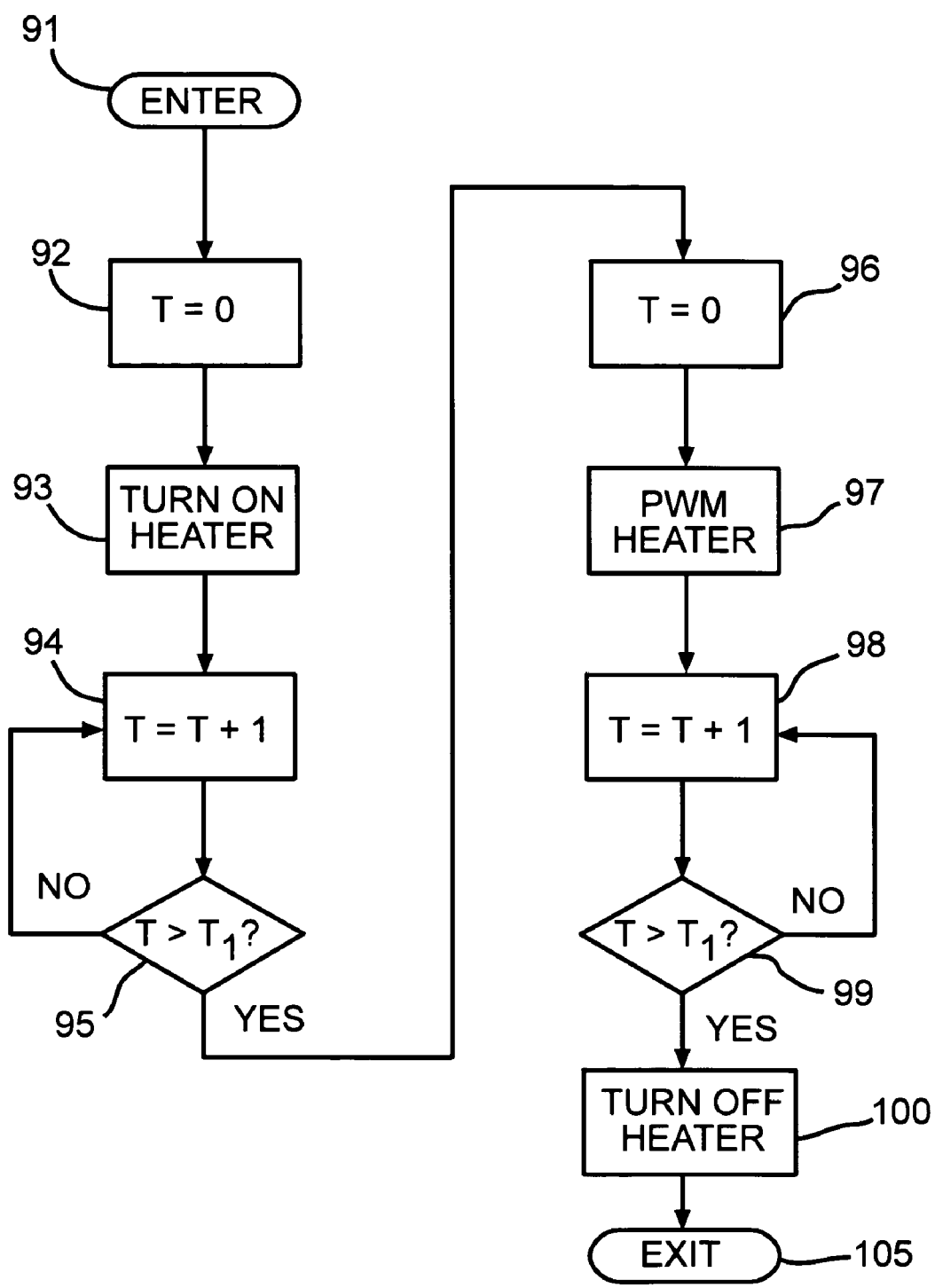
FIGS. 4A and 4B are flow charts of simplified control algorithms that can be used according to the invention to control the microvalve actuator.

FIG. 4A is a flow chart of a control algorithm according to the invention that can be used according to the invention to control a microvalve actuator with both the initial and pulsed voltages having predetermined durations. The flow chart is entered through block 91. The algorithm then advances to block 92, where a timer, T, is set to zero, which is the starting time of the initial voltage for actuating the microvalve. The algorithm then continues to block 93, where a constant initial voltage is applied to the actuator (the MEMS or "heater"). The algorithm advances to block 94, where the timer register is indexed by one. Next, the algorithm continues to decision block 95, where the content of the timer register is compared to a predetermined time period, $T_1$, which is the designated ending time of the constant initial voltage. If T is less than $T_1$, the algorithm returns to block 94 and the actuation continues.

If, in decision block 95, the period of actuation is greater than or equal to $T_1$, the initial actuation period has ended, and the algorithm transfers to block 96, where the timer is reset to zero, which is the starting time of the pulse width modulated (PWM) voltage for continuing the actuation of the microvalve. The algorithm advances to block 97, where a PWM voltage is applied to the actuator (heater) to continue the actuation. The algorithm advances to block 98, where the timer is indexed by one. Next, the algorithm continues to decision block 99, where the timer is compared to a predetermined time period $T_2$, which is the designated ending time of the PWM voltage. If T is less than $T_2$, the algorithm returns to block 98 and the actuation continues. If in decision block 99, the period of actuation is greater than or equal to $T_2$, the PWM actuation period has ended, and the algorithm transfers to block 100, where the PWM voltage to the actuator (heater) is turned off. The algorithm then exits at block 105.

Figure 4B:
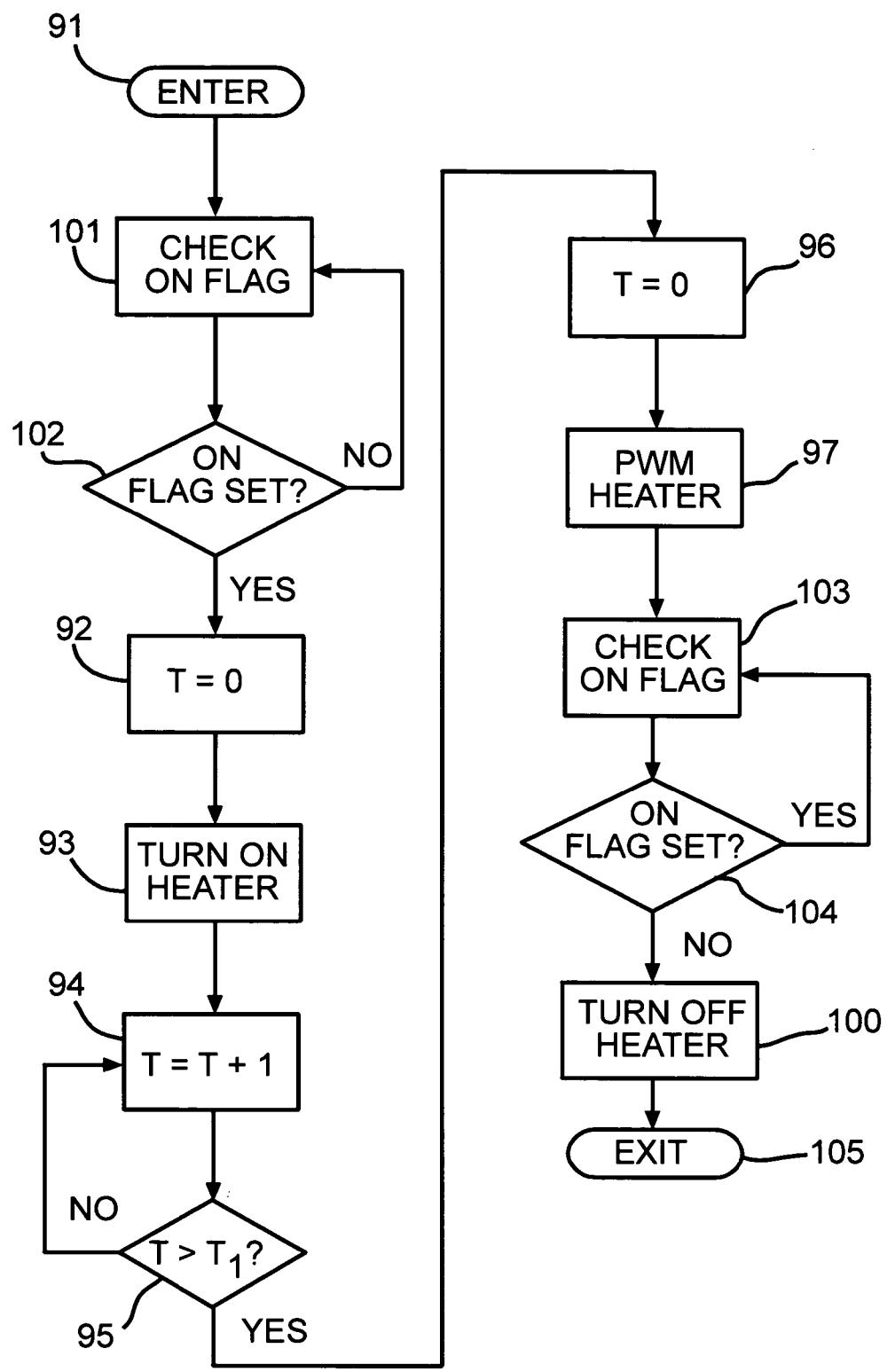

FIG. 4B is a flow chart of an alternate embodiment of a control algorithm according to the invention that can be used to control a microvalve actuator. The embodiment shown in FIG. 4B is similar to the one shown in FIG. 4A, and similar parts of the algorithm have the same numerical identifiers. However, the algorithm shown in FIG. 4B is different in its inclusion of an "on flag" which indicates whether or not the actuation should be turned on or off. After entry block 91, the algorithm proceeds to block 101, where the on flag is checked. In decision block 102, if the on flag is set, the algorithm proceeds to block 92 for the start of the initial constant actuation voltage as illustrated in FIG. 4A. If the on flag is not set in decision block 102, the algorithm returns to block 101 to again check the on flag.

The algorithm shown in FIG. 4B also includes an on flag at the end of the algorithm. After the initial voltage has ended and the PWM voltage has been started (in block 97), the on flag is again checked in block 103. The algorithm then advances to decision block 104, where, if the on flag is set, the algorithm returns to block 103 and the PWM actuation continues. If the on flag is not set in decision block 104, the PWM actuation ends in functional block 100 and the algorithm exits in block 105.

Figure 5:
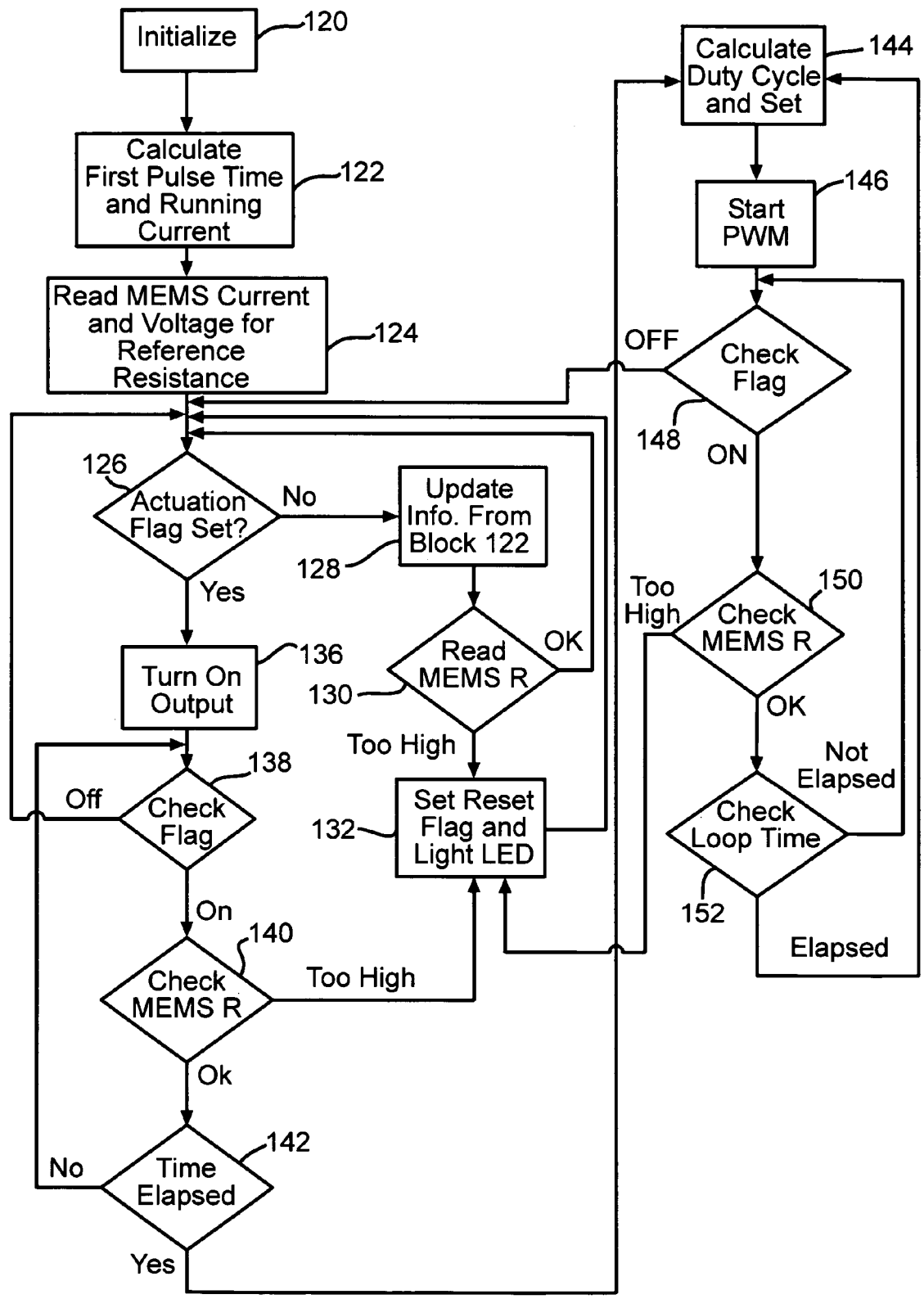
FIG. 5 is a flow chart of a more detailed control algorithm that can be used according to the invention to control the microvalve actuator.

FIG. 5 is a flow chart of a more detailed control algorithm according to the invention that can be used to control the microvalve actuator. The flow chart is entered through block 120 where a set of algorithm variables are initialized. The algorithm then advances to block 122, where the first pulse time (the initial voltage time) and the running current are calculated. The values can be a computed input, e.g., by an external computer or an internal embedded computer.

The algorithm then advances to block 124, where the resistance of the MEMS heating element is determined for a reference resistance. The resistance of the MEMS is determined by supplying a small current to the MEMS. The voltage across the MEMS and the voltage drop across a small sampling resistor are measured. The voltage drop across the small sampling resistor is proportional to the MEMS current. The MEMS resistance is calculated as the MEMS voltage divided by the MEMS current and stored. The purpose of measuring the resistance of the MEMS is to insure that it does not become too hot. The resistance is multiplied by a predetermined factor (e.g., by 1.5) and if the result is higher than a predetermined amount, the MEMS is too hot. If the MEMS becomes too hot, it is shut down as a potential failsafe. Alternatively, a reference resistance value could be stored in the system and compared to the measured resistance.

The algorithm then advances to decision block 126, where it is determined whether or not a MEMS actuation flag has been set. If the actuation flag has not been set, the algorithm proceeds along the path shown in the middle of the flow chart and advances to block 128. In block 128, the information from block 122 is updated (calculation of the first pulse time and the running current). In decision block 130, the MEMS resistance is read again and compared to the reference resistance. If the MEMS resistance is within an acceptable range compared to the reference resistance, the algorithm returns to decision block 126, where it is again determined whether or not the actuation flag has been set. If the MEMS resistance is too high, the algorithm proceeds to block 132, where a reset flag is set to disable the controller, and an LED (not shown) is lit indicating that the MEMS is too hot. Optionally, instead of using an LED, a "too hot flag" may be set and transmitted to other controllers so that the other controllers are notified of the unit shutdown. The algorithm returns to decision block 126 and continues after the MEMS has cooled sufficiently to cancel the reset flag and extinguish the LED. The optional too hot flag is also canceled, if included.

Referring again to decision block 126, if the MEMS actuation flag has been set, the algorithm proceeds along the path shown at the lower left side of the flow chart and advances to block 136. In block 136, the algorithm instructs the controller to provide an initial signal to an electronic switch that connects the power source to the microvalve actuator. The power source applies an initial constant voltage and current begins to flow through the actuator. The initial constant voltage is effective to actuate the microvalve, by either opening or closing the microvalve depending upon the particular system. Typically, the initial voltage is turned fully-on and has a relatively short duration.

After the initial voltage has been turned on, in decision block 138 a switch on flag is checked to confirm the on condition. If the initial switch on flag is confirmed to be set, the algorithm proceeds to decision block 140, where the resistance of the MEMS is checked again to make sure that it is not too high. If the MEMS resistance is too high, the algorithm returns to block 132 and proceeds as described above. If the MEMS resistance is within an acceptable range, the algorithm proceeds to decision block 142, where it is determined whether or not the amount of time set for the initial voltage has elapsed. If not, the algorithm returns to check the switch on flag in block 138. The algorithm continues in the loop in the lower left corner of the flow chart until the duration of the initial voltage has elapsed.

After the amount of time set for the initial voltage has elapsed, the algorithm proceeds to a pulse width modulation (PWM) loop, shown in the upper right corner of the flow chart, by advancing to block 144. In block 144 an initial duty cycle of the PWM voltage is calculated and set. Then, the algorithm continues to block 146 where the PWM voltage is started. The algorithm instructs the controller to provide a pulse width modulated signal to the electronic switch connecting the power source to the microvalve actuator. The resulting PWM voltage is effective to continue the actuation of the microvalve (to keep the microvalve opened or closed), while using less power than the initial voltage.

After the PWM voltage has been started, the actuation flag is checked in decision block 148. If the flag is still set, the MEMS resistance is checked in decision block 150. If the MEMS resistance is within an acceptable range, the algorithm proceeds to decision block 152 and checks to determine whether the PWM loop time has elapsed. If the PWM loop time has not elapsed, the algorithm returns to block 148 where the actuation flag is again checked, then proceeds to block 150 where the MEMS resistance is checked, and then continues to block 152 where the PWM loop time is again checked. After the PWM loop time has elapsed, the algorithm returns to block 144 where the duty cycle can be recalculated and set. Then, in block 146 the PWM continues with the new duty cycle. Thus, the PWM duty cycle may be adjusted. The PWM continues in this manner until in decision block 148 the actuation flag is reset, which ends the process.

In an alternate embodiment (not shown), the algorithm can be simplified by setting the PWM duty cycle on a register inside the controller. In that embodiment, the PWM part of the algorithm consists of starting the PWM, checking the flag, and checking the MEMS resistance.

Block Diagram of Microcontroller Based MEMS Controller

FIG. 6 is a block diagram of a microcontroller based MEMS controller, indicated generally at 154, that can be used to implement the invention. The MEMS controller 154 includes a microcontroller 156. Any suitable microcontroller can be used; however, in the preferred embodiment, the microcontroller is a Microchip model PIC16C73A microprocessor.

The MEMS controller 154 includes a power source that is shown as a battery 158. The battery 158 is connected to a regulator, preferably a low dropout (LDO) regulator 160. The LDO regulator 160 maintains a fixed output voltage to the circuit if the source voltage from the battery drops.

The MEMS controller 154 also includes a predriver and a driver, shown in block 162. Optionally, the predriver may be omitted. The battery 158 supplies voltage to the driver, which is typically a field effect transistor (FET). The predriver acts as a buffer between the microprocessor and the gate of the FET. Upon receiving a signal from the microprocessor, the predriver switches on the driver. Upon actuation, the driver operates as an electronic switch to provide voltage to the microvalve actuator 164.

Block 166, which is entitled "voltage sampling", is connected between the driver 162 and the microcontroller 156 and feeds back voltage across the MEMS 164 to the microcontroller 156. The voltage sampling 166 includes a voltage divider and a buffer amplifier that is connected to an A/D converter of the microcontroller 156. The buffer amplifier provides protection for the microcontroller 156. Alternatively, a set of resistors could be used for this purpose.

As shown in the lower right corner of the diagram, the current flows from the MEMS 164 to a sampling resistor 168 that is connected to a ground 169. The sampling resistor 168 feeds back a voltage to the microcontroller 156 that is proportional to the current through the MEMS. Then the voltage goes to ground 169. A first amplifier 170, which is an op-amp in a standard differential form, is connected to the sampling resistor 168 and senses the voltage across the sampling resistor 168. The first amplifier 170 is connected to an A/D converter of the microcontroller 156. Alternatively, the sampling resistor 168 may be directly connected to the A/D converter of the microcontroller 156. While the preferred embodiment utilizes a current sampling resistor 168, the invention also may be practiced with a current sampling integrated circuit (IC).

The MEMS controller 154 also includes a buffer and a low pass (LP) filter, shown in block 172. The output voltage from the first amplifier 170 is applied to the LP filter, which consists of an op-amp that has a resistor and a capacitor on the output. The buffer is provided to protect the microcontroller 156. The buffer and LP filter 172 are connected to an A/D converter of the microcontroller 156. Alternatively, the buffer could be replaced with a pair of resistors and a capacitor.

The MEMS controller 154 also includes an RS-232 interface 174 connected to the microcontroller 156. The RS-232 interface 174 allows the interchange of data between the microcontroller 156 and a computer or other device (not shown).

The MEMS controller 154 further includes two inputs, shown as Input 1 and Input 2. One of the inputs receives the actuation signal for the controller 154. The other input can relate to another parameter involving the functioning of the microvalve, such as braking conditions when the microvalve is part of an anti-lock brake system. In some embodiments, the inputs have switches on them that can adjust the inputs to high or low. Input protection 176 is provided between the inputs and the microcontroller 156. For example, resistors can be used to provide input protection. While two inputs are shown in FIG. 6, the invention may also be practiced with only input 1. Additionally, either or both of the inputs may be communicated from another microcontroller through a conventional interface.

A pair of level set pots 178 are also connected to the microcontroller 156. The pots can be adjusted to set selected thresholds within the microcontroller 156. For example, they can be used to set the voltage levels for the initial voltage and the PWM voltage. A second clock 180 is connected to the microcontroller 156 to facilitate the operation of the controller. A plurality of LED indicators 182 are connected to the microcontroller 156 to facilitate adjustment or troubleshooting of the controller 154.

Block Diagrams of a First Alternate Embodiment of a MEMS Controller

Figure 7A:
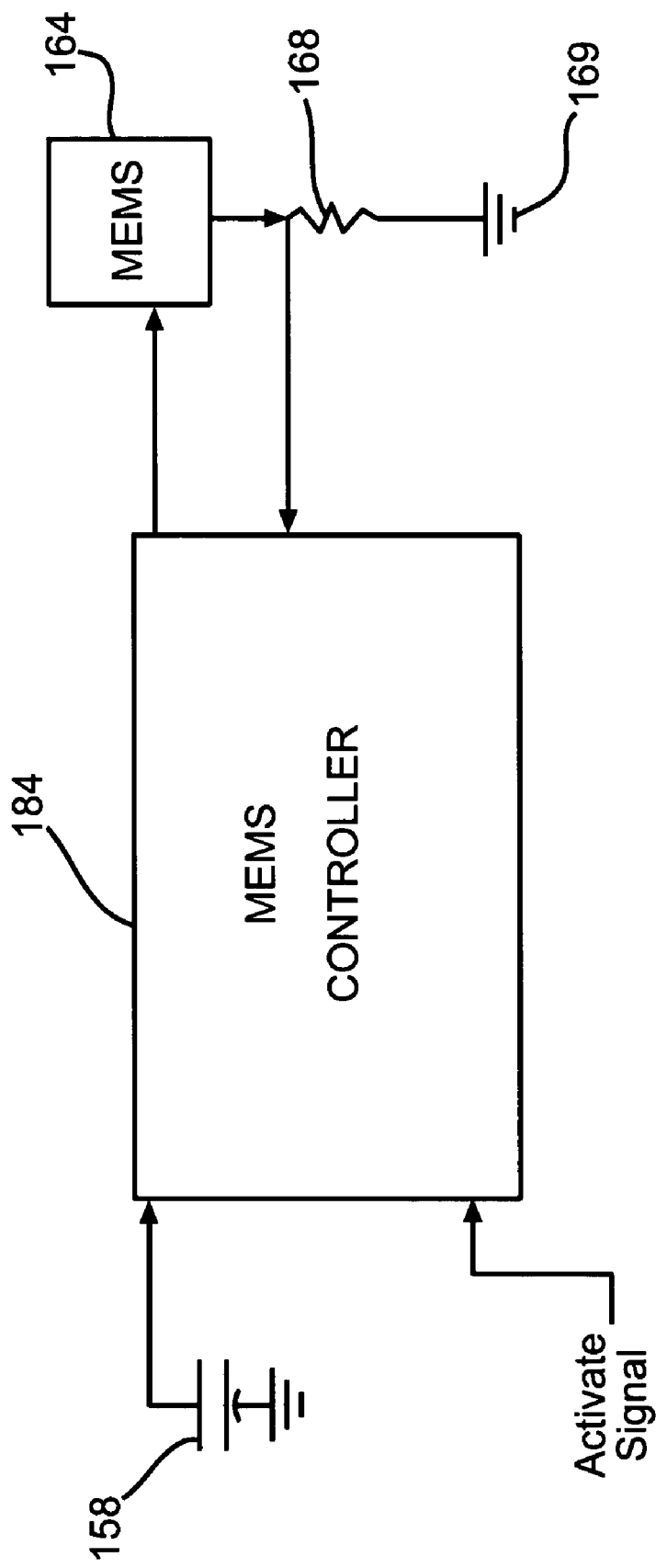
FIGS. 7A and 7B are block diagrams of a first alternate embodiment of a MEMS controller that can be used according to the invention to control the microvalve actuator.
Figure 7B:
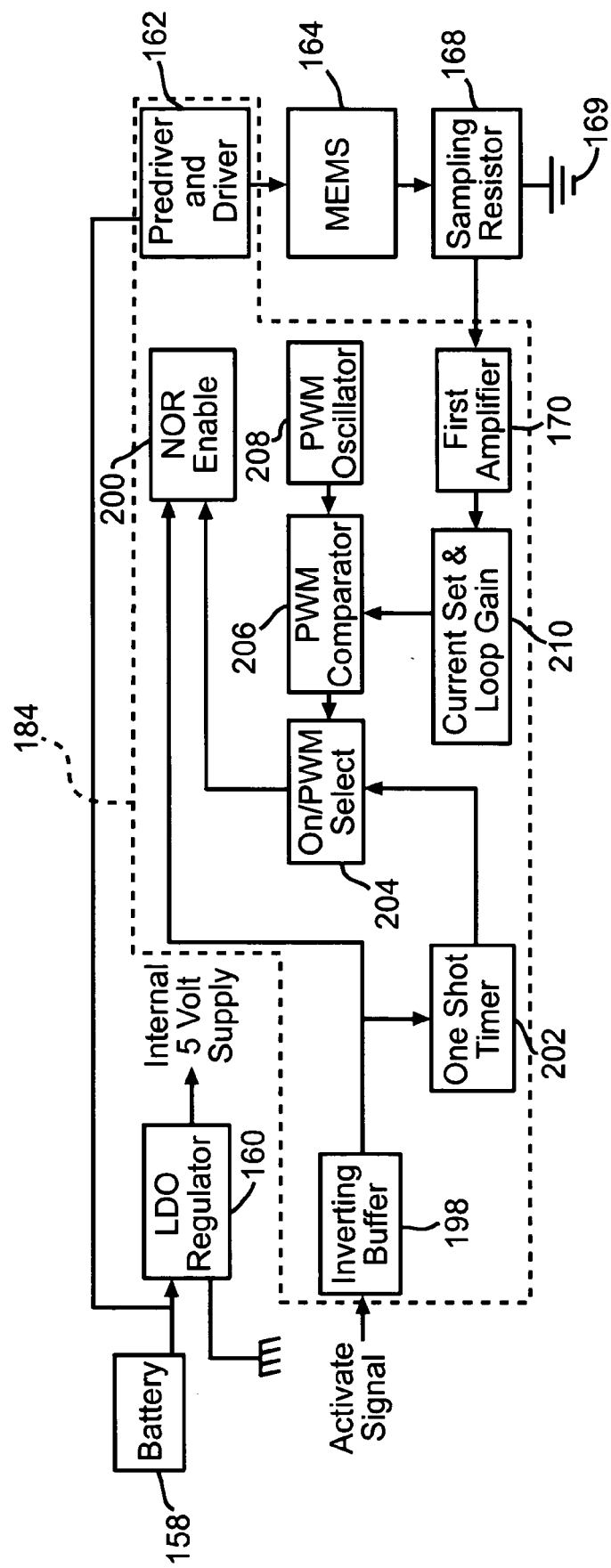

FIGS. 7A and 7B are block diagrams of a first alternative embodiment of a MEMS controller 184 and associated system components that can be used to implement the invention. FIG. 7A shows the MEMS controller 184 as a single block to illustrate how it relates to the other components of the system, while FIG. 7B shows in detail the various components of the MEMS controller 184. In contrast to the embodiment shown in FIG. 6, this embodiment of the MEMS controller 184 does not include a microcontroller. Components of the MEMS controller 184 that are similar to the components shown in FIG. 6 have the same numerical identifiers.

To following steps briefly summarize the operation of the MEMS controller:

(1) An activate signal is sent to the MEMS controller 184 to start its operation. The activate signal is inverted by an inverting buffer 198. The inverting buffer 198 is connected to a NOR enable 200 or NOR gate. The inverted activate signal is sent from the inverting buffer 198 to the NOR enable 200. An on/PWM select 204 is also connected to the NOR enable 200. The output of the NOR enable 200 is zero if any of its inputs are "high", and the output is high if both inputs are zero. The NOR enable 200 is connected to a predriver and driver 162. The on/PWM select 204 is initially off, so zero also appears at the other input terminal of the predriver 162. Because both inputs of the NOR enable 200 are zero, the output of the NOR goes high and the driver 162 switches on.

(2) A one shot timer 202 is connected between the inverting buffer 198 and the on/PWM select 204. The one shot timer 202 is also activated by the activate signal. The timer 202 is set to time for $T_1$, which is the ending time of the initial voltage.

(3) Upon timing out, the on/PWM select 204 is turned on to supply a PWM wave to the NOR enable 200. When the PWM input to the NOR enable 200 is high, the driver 162 is shut off. When the PWM is low (zero), the driver 162 is turned back on.

(4) When the activate signal goes to zero (done), the inverting buffer 198 makes the corresponding NOR input terminal "high" and the driver 162 is shut off. Additionally, the invention contemplates that the driver 162 is shut off at any point during the above-described cycle upon the activate signal being discontinued.

When the time for the fully-on state is completed, the PWM comparator 206 is enabled. The output from the PWM comparator 206 drives the predriver and driver 162. The PWM comparator 206 has two inputs. One input is a PWM oscillator 208, which outputs a triangular wave frequency set. The duty cycle is determined by the PWM comparator 206 threshold set by current set and loop gain block 210. The PWM comparator 206 level is set by taking the difference of a current set pot voltage minus the sampling resistor 168 voltage amplified by the first amplifier 170. The difference goes through the current set and loop gain amplifier 210 and then is applied to the PWM comparator 206 to set the PWM comparator 206 level. Thus, the first amplifier 170 takes the differential sampling resistor 168 signal voltage and turns it into a single-ended output.

The PWM current is set with a potentiometer contained in the current set and loop gain amplifier 210. That sets the output control level in the controller. In order to make the controller more or less sensitive, the amplifier 210 also includes a loop gain adjustment.

To summarize, the MEMS controller 184 includes the PWM oscillator 208, which generates a PWM signal in the form of a triangular wave. The controller 184 includes a bias set which establishes a point on the triangular wave for turning on the pulse (in other words, it establishes the leading edge of the pulse). Increasing the switch point level from the current set and loop gain amplifier 210 increases the duty cycle.

If the first amplifier signal is less than the bias level set, then the PWM comparator 206 makes the duty cycle longer. The longer duty cycle then increases the current. When the current is increased, the first amplifier 170 puts out a higher voltage which causes a decrease in the duty cycle. Thus, the MEMS controller 184 includes a negative feedback loop. In other words, if there is no current flowing and a certain current level is set, then the PWM has a large duty cycle. Then as the first amplifier 170 increases its output due to an increased current, the PWM comparator 206 decreases its duty cycle in response. The PWM comparator 206 comes to an equilibrium position close to the duty set. As an alternative, this system could be made into a complete PID controller.

Block Diagram of a Second Alternate Embodiment of a MEMS Controller

Figure 8:
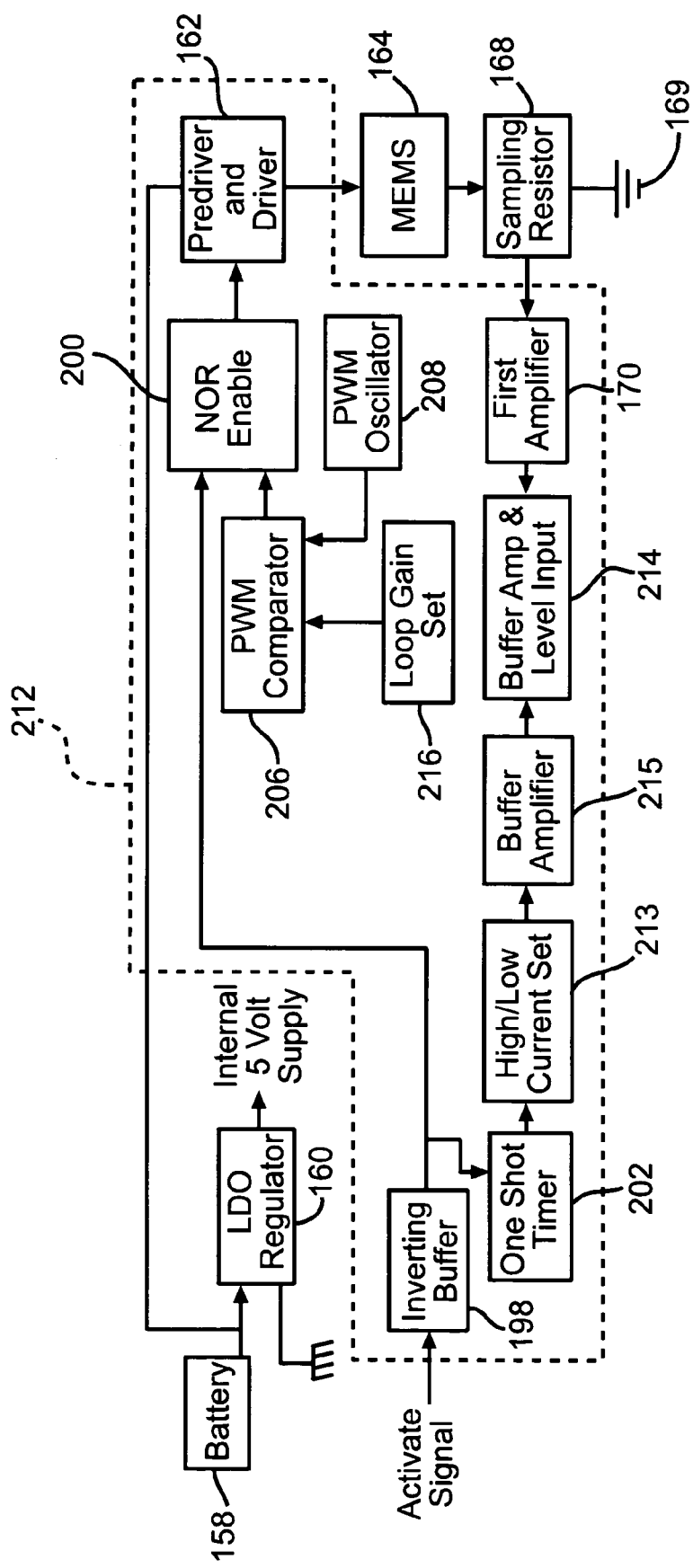
FIG. 8 is a block diagram of a second alternate embodiment of a MEMS controller that can be used according to the invention to control the microvalve actuator.

FIG. 8 is a block diagram of another alternate embodiment of a MEMS controller 212 and associated system components that can be used to implement the invention. This embodiment of the MEMS controller 212 also does not include a microprocessor. Components of the MEMS controller 212 that are similar to the components shown in FIGS. 6 and 7B have the same numerical identifiers. The MEMS controller 212 uses the same logic as the MEMS controller 184 shown in FIG. 7B, but it includes a different method for activating the PWM, i.e., it does not include an ON/PWM select. Instead of turning the voltage on full and then reducing the voltage as in the previous controller 184, the controller 212 in FIG. 8 includes a high/low current set 213 that sets two voltage levels at which the process is driven. One is a high voltage level, that corresponds to an initial turn-on level (the initial voltage), and the other is a low voltage level or running level which corresponds to the pulsed voltage. This embodiment of the controller 212 does not require that the voltage be turned on fully to begin with; the amount of voltage associated with the initial voltage can be controlled, and the amount of voltage associated with the running PWM voltage can be controlled.

In more detail, the MEMS controller 212 includes a one shot timer 202 that is started upon receiving an activate signal. While the time is activated, the high/low current set 213 supplies a high voltage value to the buffer amplifier 215 that represents the initial voltage pulse. Upon the one shot timer 202 timing out, the high/low current set 213 supplies a lower voltage to the buffer amplifier that represents the PWM voltage. The sampled voltage across the sampling resistor 168 that is proportional to the current through the MEMS 164 goes through a buffer amplifier and level input 214. The buffer amplifier and level input 214 compares the sampled voltage to the desired voltage. The voltage from the buffer amplifier 215 and the voltage from the first amplifier 170 are compared; the controller 212 is operative to make the differences between these two voltages small. If the voltage from the buffer amplifier 215 is greater than the voltage from the first amplifier 170, the controller 212 increases the duty cycle of the PWM voltage. If the voltage from the buffer amplifier 215 is less than the voltage from the first amplifier 170, the controller 212 decreases the duty cycle of the PWM voltage. This is a negative feedback system by the controller. The loop gain may be adjusted, as shown in box 216.

The controller also includes a PWM oscillator 208 as described above. A voltage in the form of a triangular wave is generated by the PWM oscillator 208. The level of the voltage from the loop gain set 216 cooperates with the triangular wave to determine the duty cycle generated by the PWM comparator 206. In other words, because the PWM oscillator 208 generates a triangular wave, an increase in the level of the voltage from the loop gain set 216 increases the duty cycle, while a decrease in the level of the voltage from the loop gain set 216 decreases the duty cycle. Again, this is a form of negative feedback by the controller 212.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of controlling an actuator of a microvalve comprising the steps of:
    (a) providing a controller for supplying a voltage to an actuator of a microvalve;
    (b) providing an initial constant voltage from the controller to the actuator which is effective to actuate the microvalve;
    (c) providing a pulsed voltage from the controller to the actuator which is effective to continue the actuation of the microvalve; and
    (d) providing the microvalve.

2. The method according to claim 1 wherein the pulsed voltage is a pulse width modulated voltage.

3. The method according to claim 2 wherein the controller is connected to at least one switch and provides an initial signal and a pulsed signal to the switch, the switch being responsive to the initial signal and the pulsed signal to regulate power from a power source to provide the initial voltage and the pulse width modulated voltage to the actuator.

4. The method according to claim 3 wherein the pulse width modulated voltage provided in step (c) has a frequency within a range from about 200 Hz to about 100,000 Hz.

5. The method according to claim 4 wherein the initial voltage provided in step (b) has a duration within a range from about 1 msec to about 1000 msec.

6. The method according to claim 5 wherein during step (c) the pulse width modulated voltage has a plurality of duty cycles.

7. The method according to claim 5 wherein during step (c) a minimum duty cycle is maintained.

8. The method according to claim 5 wherein during step (c) the duty cycle continuously varies.

9. The method according to claim 5 wherein the actuator is a thermal actuator.

10. The method according to claim 9 wherein the initial voltage has a predetermined duration.

11. The method according to claim 10 wherein the controller supplies the voltage to the actuator in response to a trigger signal.

12. The method according to claim 11 wherein the microvalve is a component of an automotive system.

13. The method according to claim 1 wherein during step (c) the duty cycle of the pulsed voltage is constant.

14. The method according to claim 1 wherein the voltage supplied during step (c) has a constant on-time and a variable frequency.

15. A controller for controlling an actuator of a microvalve comprising:
    a logic circuit having an input port and an output port, the logic circuit being responsive to a trigger signal at the input port to generate a constant output signal at the output port for a predetermined amount of time after which the logic circuit generates a pulsed output signal at the output port; and
    a normally open switch adapted to be connected between a power source and a microvalve actuator, the switch having a control port connected to the logic circuit output port and responsive to the output signal to close for the predetermined amount of time in order to provide an initial constant voltage to the microvalve actuator, and then to alternatingly open and close in response to the pulsed output signal in order to provide a pulsed voltage to the microvalve actuator.

16. The controller according to claim 15 wherein the actuator is a thermal actuator and the controller receives a feedback signal that is proportional to the temperature of the actuator, and further wherein the logic circuit includes a routine to de-energize the actuator when the feedback signal exceeds a predetermined threshold.

17. The controller according to claim 16 wherein the pulsed output signal is a pulse width modulated output signal.

18. The controller according to claim 17 wherein the logic circuit determines the duration of both the constant output signal and the pulse width modulated output signal.

19. The controller according to claim 16 wherein the controller further includes a power source.

20. The controller according to claim 19 wherein the logic circuit further includes a microprocessor.

21. The controller according to claim 20 wherein the normally open switch is an electronic switch and further wherein the controller includes a driver connected between the microprocessor and the control port of the electronic switch, the driver being responsive to an output signal generated by the microprocessor to cause the electronic switch to transition between conducting and nonconducting states.

22. The controller according to claim 19 wherein the controller further includes a one shot timer between the input port and the driver that selects either the constant output signal or the pulse width modulated output signal.

23. The controller according to claim 22 wherein the controller further includes a comparator operatively connected to the driver, and an oscillator connected to the comparator, the oscillator generating the pulse width modulated signal and sending the signal to the comparator, and the comparator adjusting the duty cycle of the pulse width modulated signal and sending the adjusted signal to the driver.

24. The controller according to claim 23 wherein the controller further includes a sensor to sense the magnitude of the current flowing through the microvalve actuator, and a negative feedback loop for the pulsed voltage supplied to the microvalve actuator, with the controller responsive to an increased actuator current to decrease the duty cycle of the pulsed output signal, and the controller responsive to a decreased actuator current to increase the duty cycle of the pulsed output signal.

25. The controller according to claim 16 wherein the output signal has a constant on-time and a variable frequency.

26. A method of operating a microvalve in a vehicle control system, the method comprising the steps of:
    (a) providing a controller connected between a power source and a microvalve actuator;
    (b) providing a constant voltage to the microvalve actuator upon the controller receiving a trigger;
    (c) providing a pulsed voltage to the microvalve actuator upon elapse of a predetermined time period; and
    (d) providing the microvalve.

27. The method according to claim 26 wherein step (c) includes sensing the magnitude of the current flowing through the microvalve actuator and adjusting the duty cycle of the pulsed voltage in response to the magnitude of the microvalve actuator current.

* * * * *